UNITED STATES PATENT OFFICE.

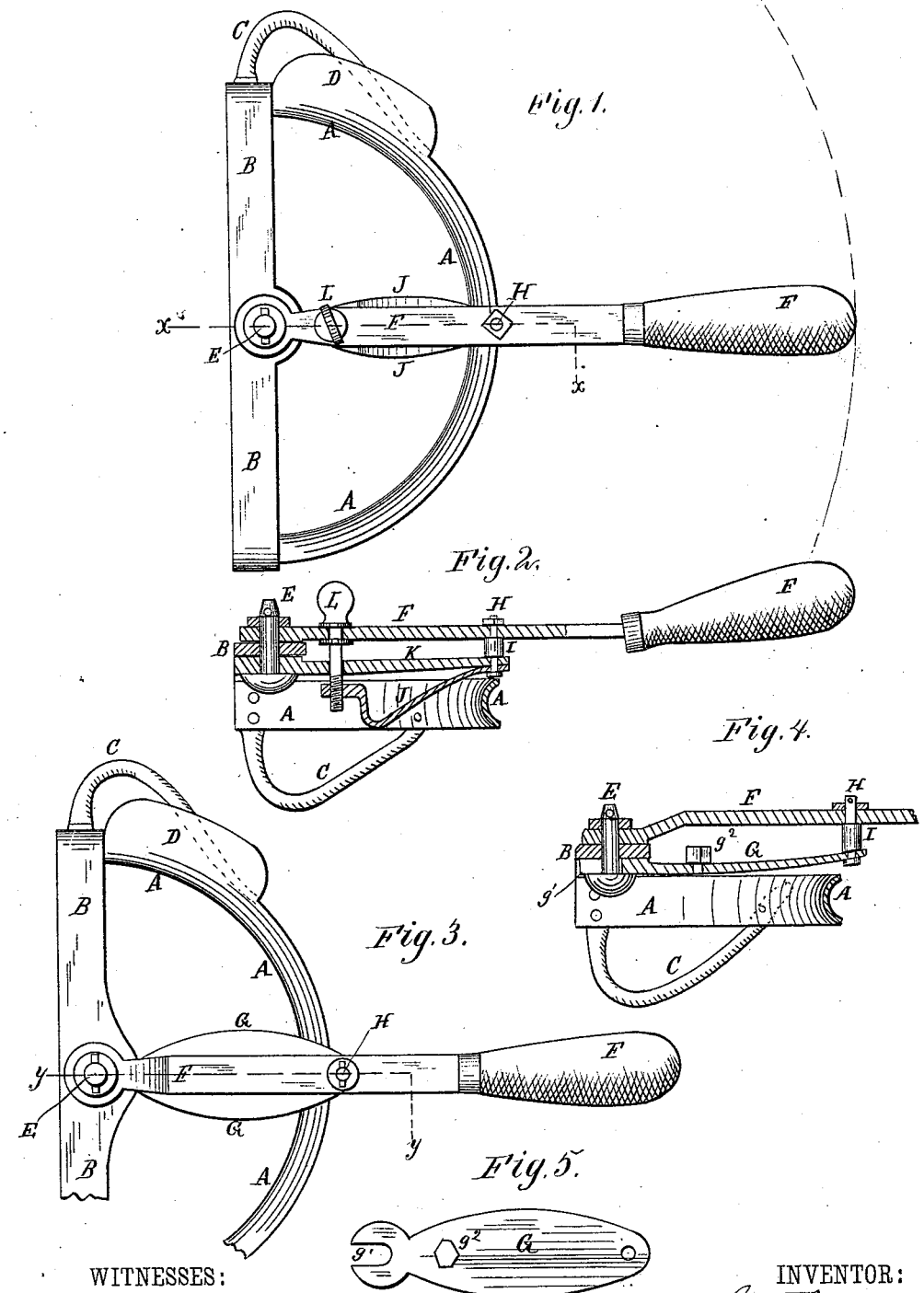

GEORGE WILLIAM SCHAEFER, OF ST. LOUIS, MISSOURI.

IMPROVEMENT IN HORSE-HOOF-PARING MACHINES.

Specification forming part of Letters Patent No. 217,642, dated July 15, 1879; application filed March 15, 1879.

*To all whom it may concern:*

Be it known that I, GEORGE WILLIAM SCHAEFER, of St. Louis city, State of Missouri, have invented a new and useful Improvement in Horse-Hoof-Paring Machines, of which the following is a specification.

Figure 1 is a top view of my improved machine arranged for paring the inner part or sole of the hoof. Fig. 2 is a detail section of the same, taken through the line $x\ x$, Fig. 1. Fig. 3 is a top view of the machine arranged for paring the outer part of the hoof. Fig. 4 is a detail section of the same, taken through the line $y\ y$, Fig. 3. Fig. 5 is a detail view of the knife for paring the outer part of the hoof.

Similar letters of reference indicate corresponding parts.

The object of this invention is to furnish an improved machine for paring horses' hoofs, by the use of which the hoofs may be pared with greater safety, and with greater ease to the operator, than when the paring is done in the usual way, which will leave the hoof level, so that no burning will be required to get a firm seat for the shoe, and which will pare the sole or hollow of the hoof evenly, and without any danger of injuring the frog.

The invention consists in the curved knife and the swiveled screw, in combination with the bar or the knife, the lever, the cross-bar, and the curved bar provided at one end with the loop and the guard-flange, as hereinafter fully described.

A is a curved or half-ring bar, the outer side of which is concaved, and its inner side is convexed, as shown in Figs. 2 and 4.

B is a cross-bar, the ends of which are bent downward and welded or otherwise attached to the ends of the curved bar A, so that the said bar B may be a little above the edge of the said bar A.

To one end of the curved bar A is attached the ends of a loop-rod, C, which projects downward and outward, and is designed to serve as a handle for steadying the device when in use.

To the upper edge of the end of the curved bar A is attached a plate or flange, D, to serve as a guard to protect the hand from the lever and knife when using the machine.

To the center of the cross-bar B is pivoted, by a pin or bolt, E, the end of the lever F that carries the knife, and which may have a slight upward offset near its pivoted end to allow the hoof-parings to escape freely.

G is the knife for paring the outer part of the hoof, which is made with a curved cutting-edge upon each side. The forward end of the knife G is secured to the lever F at a point over or a little forward of the edge of the curved bar A by a bolt or pin, H, and is kept at the proper distance from the said lever F by a tubular washer, I, placed upon the said bolt or pin between the said knife and lever.

The rear end of the knife G has a short longitudinal slot, $g^1$, formed in it to receive the bolt E, so that it can be attached and detached without removing the said bolt.

To the upper side of the rear part of the knife G is attached a short pin or stud, $g^2$, to strike against the cross-bar B, and prevent the lever F from being swung around so far as to bring either edge of the knife G against the said cross-bar B.

When the inner part or sole of the hoof is to be pared, the bent knife J is to be used, which knife J may be attached to the lower side of the knife G, or to a bar, K, secured in the same place and way as the said knife G.

The forward end of the knife J is secured by the bolt or pin H, that secures the forward end of the knife G or bar K to the lever F. The rear end of the knife J is secured by the hand-screw L, which is swiveled to the lever F, passes down through a hole in the knife G or bar K, and through a screw-hole in the rear end of the said knife J, so that the said knife may be adjusted to give more or less concavity to the sole of the hoof by turning the said screw L.

For convenience, and to avoid the frequent attachment and detachment of the knives, I prefer to attach each knife to a separate frame, in which case the frame for the inner knife, J, should be about an inch wider than the frame for the outer knife, G, to guard against cutting the forward part of the frog.

Having thus described my invention, I claim as new and desire to secure by Letters Patent—

The curved knife J and the swiveled screw L, in combination with the bar K or knife G, the lever F, the cross-bar B, and the curved bar A, provided at one end with the loop C and the guard-flange D, substantially as herein shown and described.

GEORGE WILLIAM SCHAEFER.

Witnesses:
   Dr. WM. WALDECKER,
   HERMAN MILLER,
   GERHARD H. SUDHOFF.